United States Patent [19]
Benz et al.

[11] Patent Number: 5,195,717
[45] Date of Patent: Mar. 23, 1993

[54] DEVICE FOR MOUNTING AND FIXING THE HYDRAULIC UNIT OF AN ABS

[75] Inventors: Erwin Benz, Gechingen; Günter Köhler, Sindelfingen; Karl Wörner, Uhingen, all of Fed. Rep. of Germany

[73] Assignee: Mercedes-Benz AG, Fed. Rep. of Germany

[21] Appl. No.: 697,436

[22] Filed: May 9, 1991

[30] Foreign Application Priority Data

May 15, 1990 [DE] Fed. Rep. of Germany ....... 4015561

[51] Int. Cl.$^5$ .............................................. F16M 1/00
[52] U.S. Cl. ................................................... 248/638
[58] Field of Search ....................... 248/638, 603, 224.3

[56] References Cited

U.S. PATENT DOCUMENTS

| 2,832,554 | 4/1958 | Reisch | 248/603 |
| 4,161,812 | 7/1979 | Litch | 248/638 X |
| 4,938,448 | 7/1990 | Shimazaki | 248/638 X |
| 4,993,682 | 2/1991 | Imai et al. | 248/638 |

FOREIGN PATENT DOCUMENTS 3813138 11/1989 Fed. Rep. of Germany .
3930384 11/1990 Fed. Rep. of Germany .

Primary Examiner—David M. Purol
Attorney, Agent, or Firm—Evenson, Wands, Edwards, Lenahan & McKeown

[57] ABSTRACT

A device for mounting and fixing the hydraulic unit of an anti-lock system as a carrier for the hydraulic unit includes a bracket which is itself fastenable to the vehicle body. The hydraulic unit is mounted in a vibration-insulating manner by three rubber bearings on the bracket arranged fixedly on the body. These bearings each comprise a bearing journal connected firmly to the housing of the hydraulic unit. A thick-walled rubber sleeve buffer surrounds the bearing journal coaxially. A half-shell-shaped bearing element is fixed to the bracket and supports the respective rubber buffer over a lower 180° region. The half-shell-shaped bearing elements and the shell parts are equipped with catch elements which can be brought into positive engagement with one another.

16 Claims, 3 Drawing Sheets

DEVICE FOR MOUNTING AND FIXING THE HYDRAULIC UNIT OF AN ABS

BACKGROUND AND SUMMARY OF THE INVENTION

The invention relates to a device for mounting and fixing the hydraulic unit of an anti-lock system (ABS) and/or a drive-slip control (ASR) in a road vehicle's engine space, comprising a bracket having a baseplate which is fastenable to a region of the body, and from which at least two supporting legs arranged at a distance from each other project upwardly, cylindrical rubber-buffer bearing elements in the form of a sleeve or pot for mounting in a vibration-insulating manner, i.e. vibrations with deflections occurring in the direction of the journal axes and vibrations with deflections occurring radially thereto. The hydraulic unit in a three-point mounting manner, via axis-parallel bearing journals projects from a housing of the hydraulic unit and has central axes extending parallel to the baseplate.

In the known devices which conform to standard production, a bracket is used as a carrier for the hydraulic unit and is itself fastenable to the vehicle body. The hydraulic unit is mounted on the bracket in a vibration-insulating manner by three rubber bearings. These bearings each comprise a bearing journal connected firmly to the housing of the hydraulic unit, a rubber buffer surrounding the said bearing journal coaxially and a pot-shaped sleeve which receives the rubber buffer and on the bottom of which the rubber buffer is supported axially resiliently and, surrounding the bearing journal coaxially, is also supported on the housing wall of the hydraulic unit.

The central longitudinal axes of the bearings of these known devices extend parallel to one another, horizontally in the conventional installation position. Arranged at the rear of the bracket, as seen in the longitudinal direction of the vehicle, are two receiving sleeves which are each welded in the bottom region of the sleeve to a supporting leg of the bracket projecting upwards from the baseplate of the latter. In the installed state, the front bearing element in the form of a pot-shaped sleeve is welded to the upwardly projecting leg of an angle piece which is itself fixable to the baseplate of the bracket. The known device makes it necessary to mount the hydraulic unit by insertion thereof, with its two rear rubber buffers already arranged on the bearing journals, into the receiving sleeves provided for them, thereafter slipping the front receiving sleeve arranged on the angle piece onto the rubber buffer of the front bearing of the hydraulic unit and subsequently fastening the angle piece to the baseplate of the bracket, the latter already being fixed to the body beforehand. To guarantee a sufficiently firm fit of the rubber buffers in the pot-shaped receiving sleeves, their clear diameter is slightly smaller than the outside diameter of the rubber buffers, so that in the installed state these are under a minimum radial prestress.

The known device has at least the following disadvantages. The step of joining the two rear rubber bearings together is troublesome because the increasing frictional resistance of two rubber bearings in their receiving sleeves has to be overcome simultaneously. The attachment of the angle piece carrying the third receiving sleeve to the third rubber buffer of the hydraulic unit is also laborious since the latter has to be raised somewhat to make this attachment possible. On the other hand, if the receiving sleeve of the front rubber bearing together with the angle piece carrying it is already attached before the two rear rubber bearings are joined together, it becomes appreciably more difficult to handle the hydraulic unit. There is also the danger that the bearing elements of the front rubber bearing will be displaced relative to one another or will come loose. The fixing of the angle piece carrying the receiving sleeve for the rubber buffer of the front rubber bearing is an additional operation which lengthens the time involved in mass production assembly.

An object of the present invention is, therefore, the improvement of a mounting device such that the mounting of the hydraulic unit becomes substantially easier and a specific and short mounting time is obtainable.

This object has been achieved in accordance with the present invention by providing bearing elements arranged on supporting legs in the form of upwardly open partial shells which carry the rubber buffers over a lower sector region and equipped at their ends facing away from one another with radial bottom flanges to ensure axial support of the rubber buffers. Shell parts are attachable to these partial shell-shaped bearing elements fixed to the bracket and complete the surrounding of the buffer elements over a 360° region and are guided displaceably in the axial direction on the shell-shaped bearing elements fixed to the bracket. The displaceable shell parts are secured against radial shifting as a result of positive engagement with the bearing elements and against axial shifting by catch elements locking resiliently into mutual engagement with the bearing elements.

Several advantages are afforded by the above features of the present invention. For instance, the bracket can be a one-piece sheet-metal part. After the bracket has been fastened to the body, all the bearing elements fixed to the bracket are also set in their desired position. The hydraulic unit can be slipped simply and easily from above, together with the rubber buffers attached to the bearing journals, onto the bearing elements fixed to the bracket and, if necessary, pressed somewhat into these. It is likewise possible in a simple way to complete the bearing elements located on the bracket to form altogether essentially pot-shaped receiving sleeves by pushing on the additional shell elements for example with the aid of a relatively lightweight hammer with a plastic striking part. Mounting can be carried out by simple operations which can be executed in the shortest possible time.

The features of the present invention also provide a configuration of the bearing elements fixed to the bracket which is simple and which is also advantageous in terms of mass production. In addition, the displaceable shell elements provide a functionally beneficial design.

Other features of the present invention provide a stable configuration of catch elements on the bearing elements fixed to the bracket and of those guided displaceably thereon, so as to provide a reliable securing of the displaceable shell elements against axial shifts. Additional catch elements also achieve a correspondingly increased safety of the fixing.

The arrangement of such catch elements according to the present invention is beneficial both functionally and in terms of mass production. A presently preferred embodiment is characterized by an especially simple configuration of the device as a whole, is easy to mount and can be produced in a technically simple way, especially in the event that the displaceable shell elements are injection-molded plastic parts.

BRIEF DESCRIPTION OF THE DRAWINGS

These and other objects, features and advantages of the present invention will become more apparent from the following detailed description of presently preferred embodiments when taken in conjunction with the accompanying drawings, wherein.

DETAILED DESCRIPTION OF THE DRAWINGS

Figure 1:
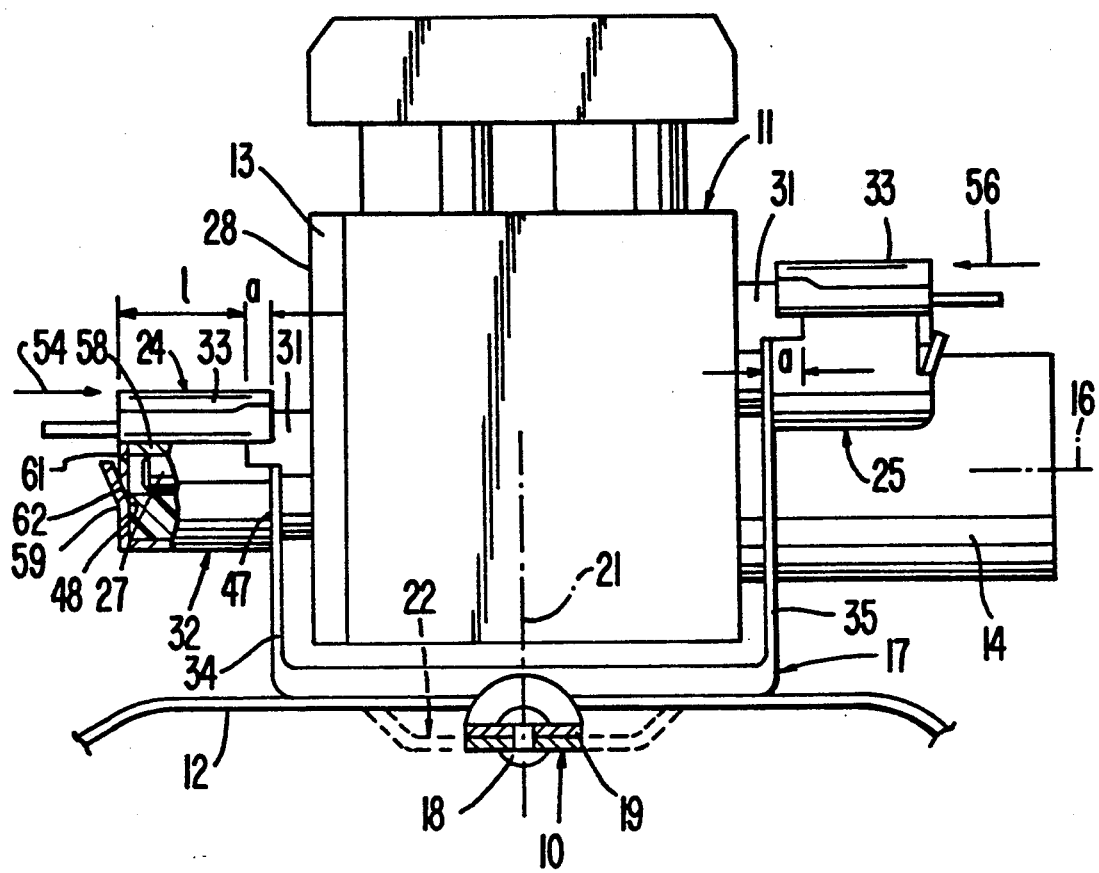
FIG. 1 is a simplified side view of a device according to the present invention with three rubber bearings for the hydraulic unit used.
Figure 2:
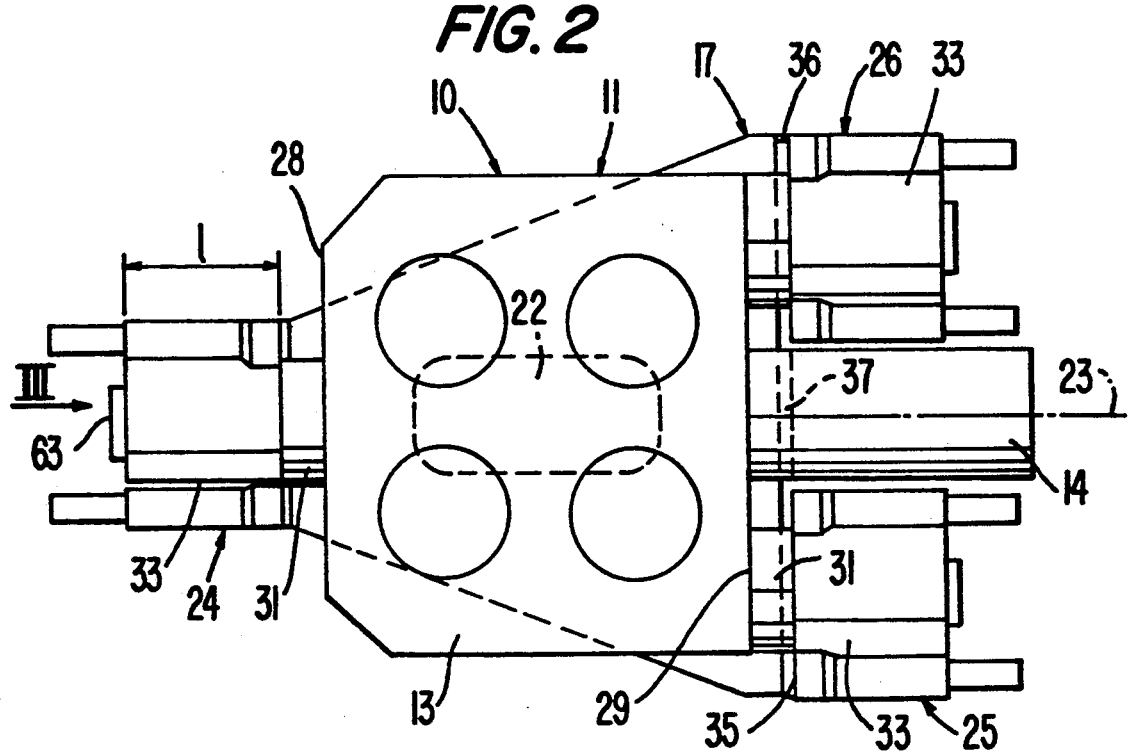
FIG. 2 is a top view of the device according to FIG. 1.

The device shown in side view in FIG. 1 and in top view in FIG. 2 is designated generally by the numeral 10, and is for mounting and fixing a hydraulic unit designated generally by the numeral 11, of an anti-lock system (ABS) and/or a drive-slip control device (ASR). The device is installed in the engine space of a road vehicle which is represented in FIG. 1 solely by an upper region of its body wheel case 12 which receives, for example, the left front wheel of the vehicle and to the top side of which is fastened the device 10, via which the hydraulic unit 11 is itself fixed to the body 12.

The illustrated hydraulic unit 11 corresponds externally to that of a standard ABS device working on the return-flow principle. The unit 11 comprises an essential cuboid housing block 13 which accommodates solenoid valves (not shown in detail) assigned individually to the vehicle wheels as brake-pressure regulating valves and return-flow pumps which are each assigned individually to the vehicle wheels as brake-pressure regulating valves and return-flow pumps which are each assigned individually to the two brake circuits of the vehicle and which have a common drive motor 14 arranged with its central longitudinal axis 16 horizontal and extending parallel to the longitudinal direction of the vehicle.

As a carrier for the hydraulic unit 11 there is a bracket designated generally by the numeral 17 and fastened to the body 12 of the vehicle. In the illustrated embodiment of FIG. 1, a rivet 18 fixes the bracket 17 to a baseplate 19 so as to rest flush against and be fixed to the wheel case 12. To prevent the possibility that the bracket 17 will rotate about the vertically extending central rivet axis 21, the baseplate 19 of the bracket 17 possesses, as indicated by broken lines in FIG. 1, a shallow groove-shaped or undulated profile 22 which is in positive engagement with a corresponding profiling of the wheel case 12 and which thereby makes it possible to fix the hydraulic unit 11 in the engine space of the vehicle with a specific orientation.

The bracket 17 is configured symmetrically relative to its longitudinal mid-plane 23 (FIG. 2) which extends vertically in the installation position and in which, as seen in the mounting position, the central longitudinal axis 16 of the drive motor 14 of the return-flow pumps of the hydraulic unit 11 also runs.

By way of three rubber bearings 24, 25 and 26 which, as can best be seen from FIG. 2, are arranged as it were at the corners of an isosceles triangle, the hydraulic unit 11 is mounted in a vibration-insulating manner on the bracket 17 fixed to the body. A front rubber bearing 24 and two rear rubber bearings 25 and 26 are thus provided, as viewed in the longitudinal direction of the vehicle. Insofar as terms, such as "front", "rear", "horizontal" or "vertical" or the like, are used hereafter to describe an arrangement or a path, these particulars relate to the installation position of the hydraulic unit 11 and of the bracket 17 carrying it on the vehicle 12.

The rubber bearings 24, 25 and 26 are of identical construction and respectively comprise bearing journals 27 as bearing elements which are connected firmly to the housing block 13 and which project at right angles from its front vertical wall 28 and its rear vertical wall 29, and thick-walled rubber buffers 31 in the form of a circular-cylindrical sleeve and which can be slipped onto the bearing journals 27 and, as further bearing elements, shell-shaped bearing elements 32 fixed to the bracket 17. The hydraulic unit 11 can be resiliently supported in the axial and radial directions in the bearing elements 32, by the rubber buffers 31 over a lower sector region which, in the illustrated embodiment, amounts to 180°, and to that extent at least surrounding them. Shell parts 33 constitute further bearing elements which can be attached to part shell-shaped elements 32 fixed to the bracket and complete the surrounding of the rubber buffers 31 over 360° as shown in FIG. 4, and which, in the mounting position shown, complete the shell-shaped bearing elements 32 fixed to the bracket, as it were to form altogether pot-shaped bearing sleeves, within which the rubber buffers 31 are held positively and, if appropriate, under a moderate radial and/or axial prestress.

The front bearing element 32, fixed to the bracket 17, is arranged facing away from the front vertical limiting wall 28 of the housing block 13, on a side of a front supporting leg 34 projecting vertically upwards from the baseplate 19 of the bracket 17. The two rear rubber bearings 25 and 26 are arranged respectively, facing away from the rear vertical limiting wall 29 of the housing block 13, on the outside of supporting legs 35, 36 which project vertically upwards from the baseplate 19 of the bracket 17 and between which the hydraulic unit drive motor 14 of the return-flow pumps is arranged, projecting beyond the rear transverse edge 37 of the baseplate 19 of the bracket 17, with most of its axial length protruding rearwards.

Figure 3:
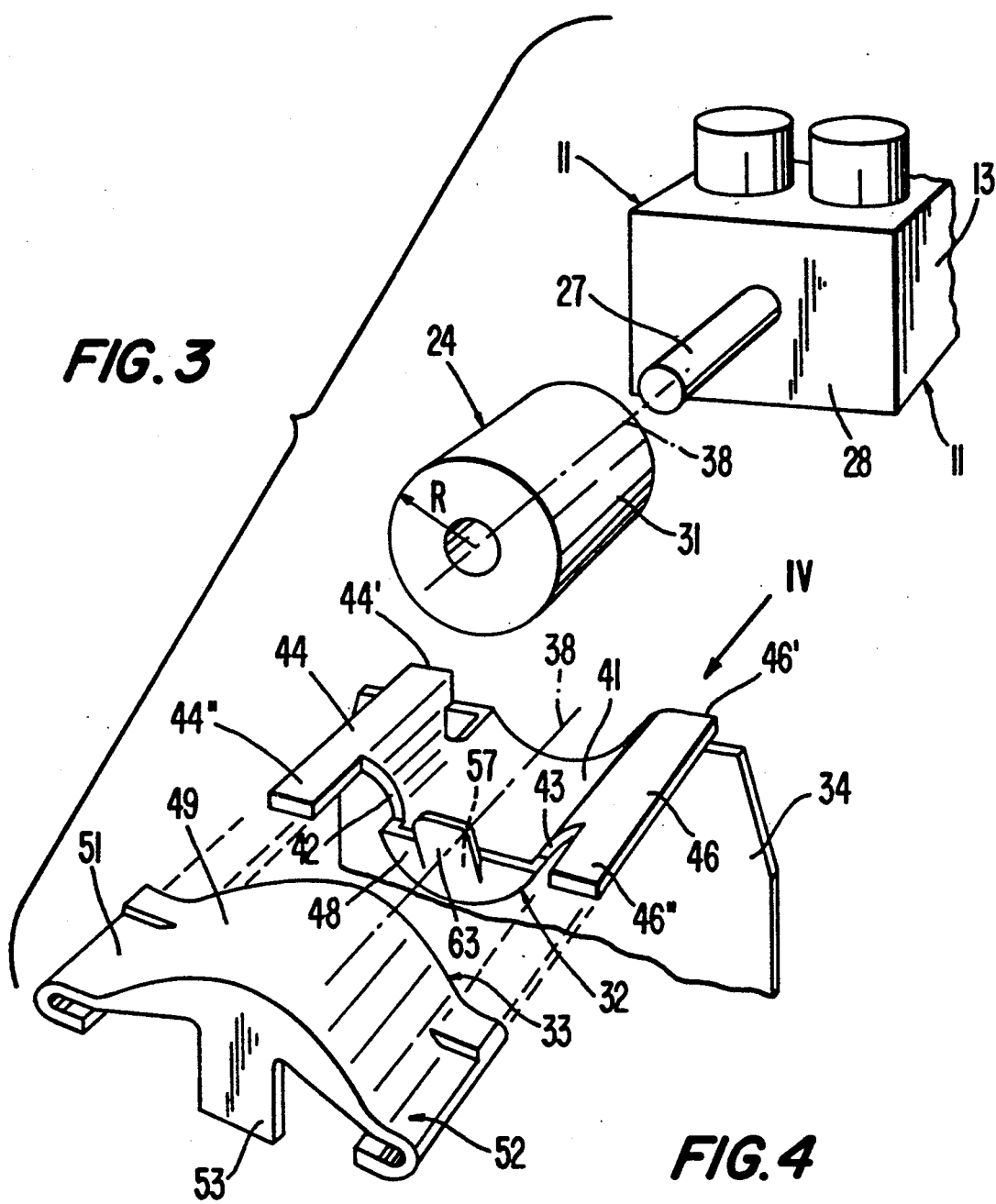
FIG. 3 is a perspective exploded view of the front rubber bearing of the device.
Figure 4:
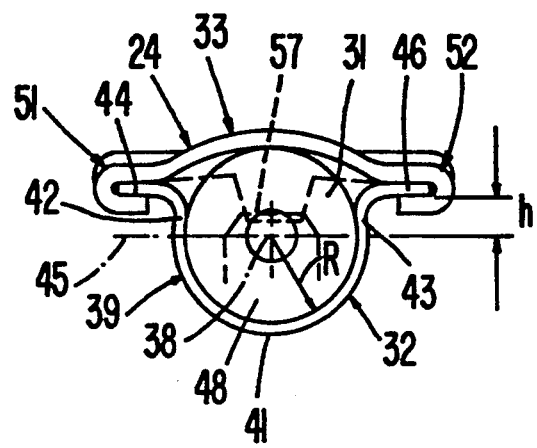
FIG. 4 is an end view of the bearing in FIG. 3 in the mounted state, in the direction of the arrow IV in FIG. 3.

For a more detailed explanation of the rubber bearings 24, 25 and 26, reference will now also be made to the exploded representation of FIG. 3 and the front view of FIG. 4 which relate to the front rubber bearing 24. The shell-shaped bearing element 32 fixed to the bracket is configured as a one-piece part formed on the front supporting leg 34 of the bracket 17 and has an upwardly open, U-shaped shell envelope 39, as seen in section at right angles to the central longitudinal axis 38 of the bearing 24, and possessing, as seen in profile cross-section, a semicircular yoke region 41 which supports and carries the rubber buffer 31 of this bearing 24 over its lower 180° circumferential region. The inner radius of curvature R of the yoke region 41 corresponds to the outer radius of the rubber buffer 31. Short vertical side legs 42, 43 are joined to the yoke region 41 and project upwards on both sides of the rubber buffer 31 to be received in the yoke region 41. The height h of the legs 42, 43 measured from the horizontal longitudinal mid-plane 45 containing the central longitudinal axis 38 of the bearing 24 amounts, in the illustrated embodiment, to approximately R/3 and is therefore clearly smaller than the outer radius R of the rubber buffer 31. The height h of the side legs 42, 43 extending parallel to one another and parallel to the central longitudinal axis 38 of the bearing 24 can also be between R/4 and R/2.

Radially narrow outwardly pointing longitudinal guide legs 44, 46 are joined to the upper longitudinal edges of the side legs 42, 43 of the approximately half-shell-shaped bearing element 32 and point outwardly with a small radius of curvature corresponding approximately to the wall thickness of the shell element 32. The guide legs 44, 46 extend at right angles to the side legs 42, 43 and, like the side legs 42, 43 themselves, terminate at an axial distance a (FIG. 1) from the adjacent outer face of the front supporting leg 34 and otherwise extend over most of the axial length 1 of the shell envelope 39 of the shell element 32. The shell element 32, at its free end (that is to say the end facing away from the front supporting leg 34), is equipped with a basically semicircular radial bottom flange 48, on which the rubber buffer 31 is supported axially in the installed state and which then also rests flush against the front limiting wall 38 of the housing block 13, and is supported axially there.

The upper shell parts 33 are attachable to the shell-shaped bearing elements 32 fixed to the bracket by which the shell-shaped bearing elements 32 fixed to the bracket can be completed to form altogether pot-shaped receiving sleeves for the rubber buffers 31 which are thus surrounded along their entire 360° circumference by these pot-shaped bearing shells 32, 33. The parts 33 have a shallow bell-shaped envelope 49, whose lateral longitudinal edge regions 51, 52 are inwardly open U-shaped guide sections. These regions 51, 52 guide the shell parts 33 for axial displacement along the longitudinal guide legs 44, 46 of the shell-shaped bearing elements 32 fixed to the bracket. The U-shaped guide sections 51, 52 of the displaceable shell parts 33 have, over most of their length, a clear cross-section complementary with the cross-section of the longitudinal guide legs 44 and 46 of the bearing-shell elements 32 fixed to the bracket. On their side facing respectively away from the front vertical wall 28 or rear vertical wall 29 of the hydraulic unit housing block 13, the displaceable shell parts 33 are equipped with a resiliently flexible catch tongue 53 which, when the shell parts 33 are displaced slightly beyond their holding position shown in FIGS. 1 and 2 when being pushed onto the shell-shaped bearing elements 32 in the direction of the arrows 54 and 56, crosses a horizontal catch edge 57 of the radial bottom flange 48 of the respective bearing element 32 fixed to the bracket, at the same time experiencing resiliently elastic deformation. Thereafter, the tongue 53 springs into a position engaging behind the catch edge 57, in which, as shown in the left-hand part of FIG. 1, the radially extending inner faces 58, 59 of the catch tongue 53 or of the radial bottom flange 48, on which the respective rubber buffer 31 is supported with its outer annular end face, are arranged in a coplanar manner. The catch faces 61, 62 of the catch tongue 53 or of the catch edge 57 which thereby come to bear on one another extend at an inclination of the same angle relative to the horizontal. The inner catch face 62 of the bottom flange 48 of the lower shell-shaped bearing element 32 is arranged on a bead 63, terminating at the top in the catch edge 57, of the bottom flange 48 of the bearing element 32 fixed to the bracket.

By virtue of these catch elements, namely the catch tongue 53 and catch edge 57, the displaceable shell parts 33, remain secure against shifting out of a desired position once they have been pushed into the desired position to ensure that the rubber buffers 31 are surrounded and to complete the shell-shaped bearing elements 32 fixed to the bracket to form an altogether approximately pot-shaped sleeve.

Figure 5:
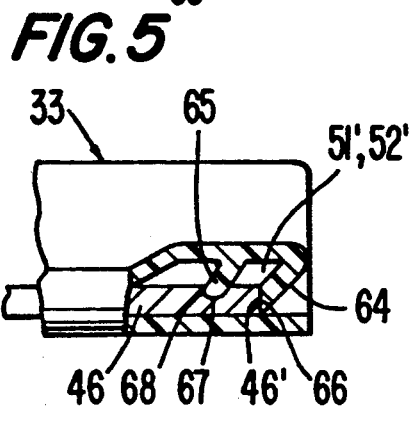
FIG. 5 is a detail view of the configuration of catch elements for the axial fixing of the displaceable shell elements of the rubber bearings shown in FIGS. 1 to 4.

Further catch elements to ensure a positive fixing of the displaceable shell parts 33 in their desired position are also arranged on the side of the displaceable shell parts 33 facing the housing block 13 and, as can be seen in the detailed isolated view in FIG. 5, are configured as obliquely extending webs 64, 65 which are arranged within a widened end portion 51', 52' of the U-shaped guide sections 51, 52 of the displaceable shell parts 33. The webs 64, 65 are made in one piece with the upper groove cheek and which can be pushed beyond the guide legs 44, 46, thereby experiencing resiliently elastic deformation. In the desired position of the displaceable shell parts the webs 64, 65 can ensure the fixing of the shell parts by way of free end edges 66, 67 which extend transversely relative to the direction of displacement and lock against the inner transverse edges 44', 46' of the respective longitudinal guide legs 44, 46 or against supporting faces of transverse grooves 58 of the longitudinal guide legs 44, 46 by positive engagement therewith so as to be supported axially thereon.

The device 10 allows a simple mounting of the hydraulic unit 11. After the bracket 17 is mounted in the engine space of the vehicle 12 and the rubber buffers 31 are slipped onto the bearing journals 27, the hydraulic unit 11 is inserted from above into the half-shell-shaped bearing elements 32 fixed to the bracket 17. Thereafter the displaceable shell parts 33 are attached to the longitudinal guide legs 44, 46 and, by being shifted therealong, are displaced into the desired position completing the fastening of the hydraulic unit 11.

For a further simplification of the mounting, the longitudinal guide legs 44, 46 of the bearing elements 32 fixed to the bracket are equipped with rearward extensions 44'', 46'' that is to say the extensions 44'' project axially beyond the bottom flanges 48, and to which the displaceable shell parts 33 can be attached from the outset, so that these merely have to be pushed into the fixing position after the insertion of the hydraulic unit 11 into the bearing elements 32 fixed to the bracket.

Figure 6:
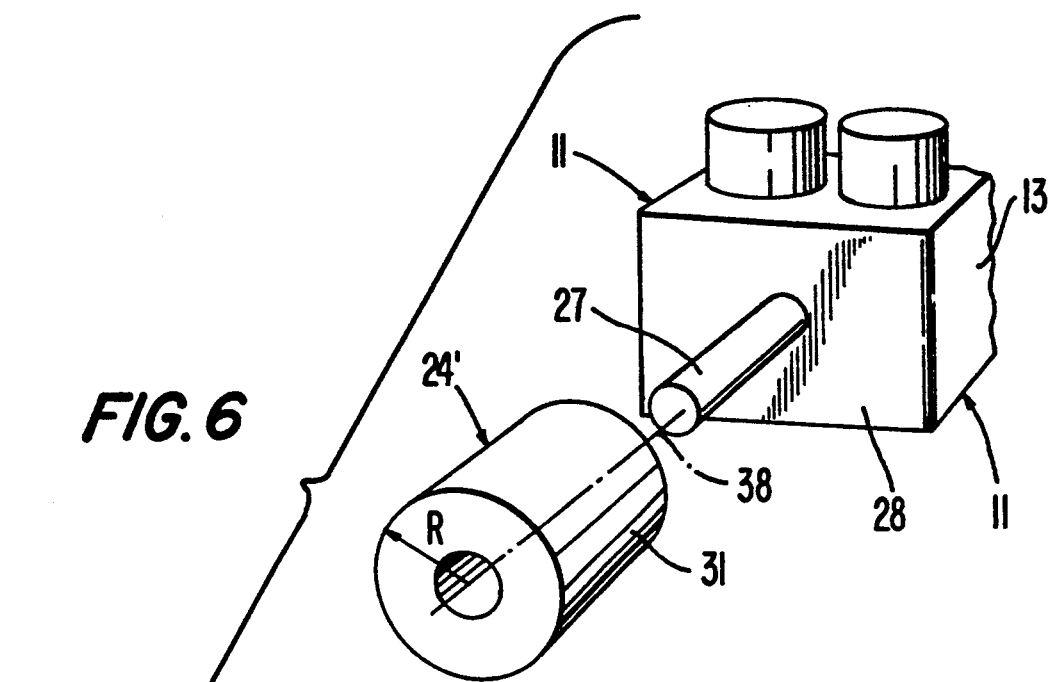
FIG. 6 is a perspective exploded view of another embodiment of a rubber bearing for the device of FIGS. 1 and 2.

Another embodiment of the present invention is shown in FIG. 6 where elements similar to the elements in FIGS. 1–3 are designated by the same numerals, including those with primes to point to constructional identity of the thus designated elements with the correspondingly designated elements of FIGS. 1 to 3 and to refer to the relevant parts of the description.

The rubber bearing 24' illustrated in FIG. 6 differs from that shown in FIG. 3 only in the configuration of the shell-shaped bearing element 32' fixed to the bracket 17 and in the configuration of the axially displaceable shell part 33' which, in its position of use attached to the shell-shaped bearing element 32' fixed to the bracket, completely surrounding the rubber buffer 31 over a full 360°.

Figure 7:
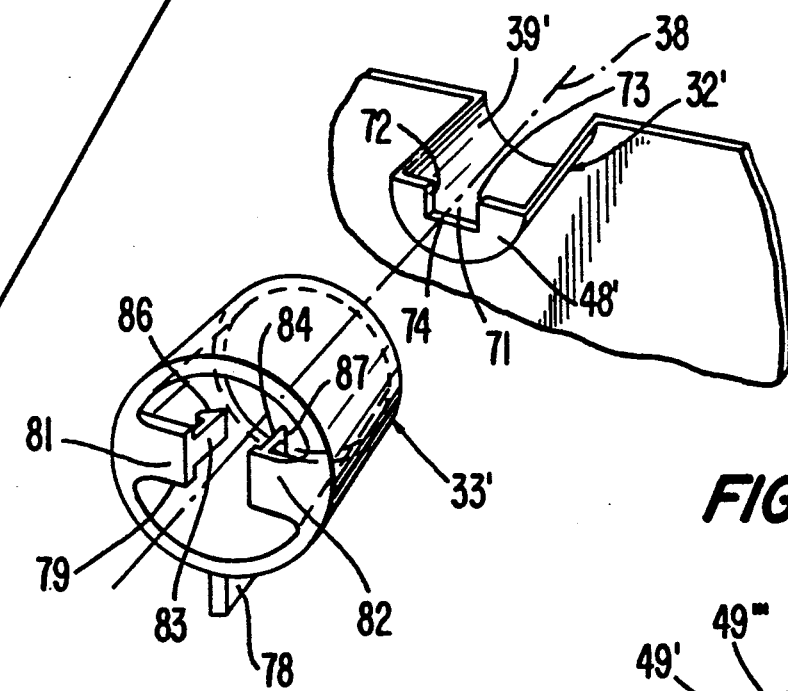
FIG. 7 is a cross-sectional view of the bearing of FIG. 6 at right-angles to its central axis.
Figure 7:
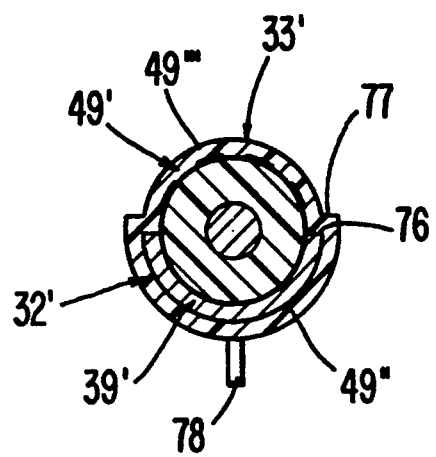

As can best be seen in FIG. 7, the bearing element 32' fixed to the bracket has a semicircular-cylindrical envelope 39' whose axis of curvature is the central axis 38 of the rubber bearing 24'. A bottom flange 48' extends at right angles to the axis 38, i.e. radially from the axis 38 and is equipped with a rectangularly edged recess 71 and opens upwardly, as seen in the use position defined by parallel vertical edges 72, 73 and a lower horizontal transverse edge 74.

The shell part 33' which can be slipped onto the bearing element 32' fixed to the bracket and which is displaceable in the axial direction thereon is a closed annular plastic sleeve whose envelope 49' mates at least in places, in its lower semicircular-cylindrical part 49''', with the outer envelope surface of the bearing element 32' in an upper region 49'''' shown in FIG. 7, likewise extends essentially semicircular-cylindrically and mates at least in places on its inner envelope surface with the upper region of the rubber buffer 31.

An inner step 76, whose radial width corresponds to the material thickness of the envelope 39' of the bearing element 32' and an outer radial visible step 77, via which an assembler can ascertain the orientation of the displaceable shell part 33' necessary for the illustrated arrangement of the bearing elements 32' and 33', are provided between the two envelope parts 49''', 49''''. For this purpose, there is also an outer radial longitudinal rib 78 of the displaceable shell part 33' which points downwards in the illustrated installation position of the displaceable shell part 33'.

The displaceable shell part 33' is equipped on its outer edge 79, i.e. facing away from the hydraulic unit 11, with radially inward-pointing resilient tabs 81, 82, Catch tongues 83, 84 start from the free ends of the tabs 81, 82 and extend parallel to the central axis 38 of the rubber bearing 24' so as to point into the interior of the bearing element 32'. The tongues 83, 84 are each equipped at their free inner ends with a catch nose 86 and 87 which, by slipping the shell part 33' onto the shell-shaped bearing element 32', can be brought into positions engaging behind the vertical edges 72, 73 of the recess 71 of the bottom flange 48' of the bearing element 32', thereby anchoring the displaceable shell part 33' on the bearing element 32', and fixing to the bracket 17 the rubber buffer 31', of the bearing 24', surrounding the bearing journal 27 with the hydraulic unit 11.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A device for mounting and fixing the hydraulic unit of at least one of an anti-lock system and a drive-slip control device in an engine space of a road vehicle body, comprising a bracket having a baseplate which is fastenable to a region of the body, and from which at least two supporting legs arranged at a distance from each other project upwardly and carry three cylindrical rubber-buffer bearings comprising shell-shaped holding elements for rubber buffers constituted by a sleeve or a pot for mounting the hydraulic unit in a vibration-insulating manner, in a three-point mounting manner, by journals projecting from a housing of the hydraulic unit and engaging the rubber buffers having central axes parallel to the baseplate, wherein the holding elements arranged on the supporting legs are upwardly open partial shells for carrying the rubber buffers over a lower sector regions thereof, which shells are provided at their ends facing away from one another with radial bottom flanges for axially supporting the rubber buffers, and shell parts are attachable to these bearing elements fixed to the bracket to completely surround the buffer elements over 360°, which shell parts are guided displaceably in the axial direction on the bearing elements and are secured against radial shifts as a result of positive engagement with the bearing elements fixed to the bracket and against axial shifts by catch elements locking resiliently into mutual engagement with the bearing elements fixed to the bracket.

2. The device according to claim 1, wherein the bearing elements arranged on the upwardly projecting supporting legs, supportively receiving the rubber buffers and fixed to the bracket have a U-shaped upwardly open shell envelope which has a semicircular yoke region carrying a respective one of the rubber buffers over a lower 180° circumferential region and vertically upward-projecting side legs which are joined to the yoke region and extend parallel to one another and parallel to the central longitudinal axis of a respective received one of the rubber buffers and of the bearing journal of the hydraulic unit received thereby, said upwardly extending legs having a height which is smaller than an outer radius of the yoke region and amounts to between one-fourth and one-half of the outer radius, longitudinal guide legs being joined with and parallel to upper longitudinal edges of the side legs and extend over most of the length of the envelope of the bearing elements and are approximately radially disposed relative to the central longitudinal axis of the rubber buffers and at approximately right angles to the side legs of the bearing element envelope and to which the shell parts provided with at least one catch element can be axially displaceably attached under guidance, so as to surround these on the outside by means of U-shaped guide sections, such that, when the displaceable shell part is displaced into a predetermined position, the catch element comes into a catch position engaging behind a catch edge of the bearing part fixed to the bracket and thereby secures the displaceable shell part against axial shifting.

3. The device according to claims 2, wherein the displaceable shell part is provided, at its end remote from the hydraulic unit, with a radially extending catch tongue which is resiliently deflectable in the axial direction and which starts from an envelope region of the displaceable shell element having a shallow bell joining the U-shaped guide sections and mating over a sector region with the outer envelope surface of the respective rubber buffer, whereby in the mounting position of the shell part to ensure fixing to the bearing element, a transverse catch edge of the radial bottom flange of the bearing element is arranged on its side facing the rubber buffer so as to engage behind it with a narrow overlap, such that inner faces of the catch tongue, which inner faces face the rubber buffer extend coplanar.

4. The device according to claim 3, wherein the longitudinal guide legs of the bearing elements fixed to the bracket terminate in transverse edges which extend in a plane running at right angles to the central longitudinal axis and which are arranged at an axial distance from at least one of the supporting legs fixed to the bracket, and the displaceable shell parts are provided with resiliently flexible catch tongues having free ends which, in predetermined position of the displaceable shell parts, are mutually supported axially relative to the transverse edges, of the longitudinal guide legs, facing the hydraulic unit.

5. The device according to claim 4, wherein the displaceable shell parts are provided with web-shaped resiliently flexible catch elements arranged at an axial distance from their ends facing the hydraulic unit and which, in the predetermined position of the displaceable shell parts, lock into depressions, which are configured to complement the free ends of the longitudinal guide legs of the bearing elements fixed to the bracket.

6. The device according to claim 4, wherein the resiliently flexible catch webs of the displaceable shell parts are arranged on guide-groove portions, whose clearance is larger by at least the deflection stroke of the catch webs than the thickness of the longitudinal guide legs of the bearing elements fixed to the bracket.

7. The device according to claim 6, wherein the displaceable shell parts are provided with web-shaped resiliently flexible catch elements arranged at an axial distance from their ends facing the hydraulic unit and which, in the predetermined position of the displaceable shell parts, lock into depressions, which are configured to complement the free ends of the longitudinal guide legs of the bearing elements fixed to the bracket.

8. The device according to claim 1, wherein the bearing element fixed to the bracket has a semicircular-cylindrical envelope, with the bottom flange of the bearing element having a rectangularly shaped recess open at one end, the parallel edges of which extend vertically in the installation position, the displaceable shell part being configured as a closed annular sleeve which, as seen in the use position, mates at least in places in a lower part of its envelope with the outer envelope surface of the bearing element fixed to the bracket and in an upper part of its envelope with the outer envelope surface of the rubber buffer, and the displaceable shell part being provided on outer edge with central catch tongues which start from radially inward-pointing resilient tabs and extend in the axial direction, and the catch noses of which can be brought, as a result of the displacement of the shell part into its fixing position, such that the catch noses engage behind the lateral edges of the recess.

9. The device according to claim 1, wherein the displaceable shell parts are plastic injection moldings.

10. The device according to claim 9, wherein the plastic is a copolymer of polymethylene oxide.

11. The device according to claim 10, wherein the bearing elements arranged on the upwardly projecting supporting legs, supportively receiving the rubber buffers and fixed to the bracket have a U-shaped upwardly open shell envelope which has a semicircular yoke region carrying a respective one of the rubber buffers over a lower 180° circumferential region and vertically upward-projecting side legs which are joined to the yoke region and extend parallel to one another and parallel to the central longitudinal axis of a respective received ones of the rubber buffers and of the bearing journal of the hydraulic unit received thereby and have a height smaller than an outer radius of the yoke region and amounts to between one-fourth and one-half of the outer radius, longitudinal guide legs being joined with and parallel to upper longitudinal edges of the side legs and, as seen from the free ends of the bearing elements, extend over most of the length of the envelope of the bearing elements and are radially disposed relative to the central longitudinal axis of the rubber buffers and at right angles to the side legs of the bearing element envelope and to which the shell parts provided with at least one catch element can be axially displaceably attached under guidance, so as to surround these on the outside by means of U-shaped guide sections, such that, when the displaceable shell part is displaced into a predetermined position, the catch element comes into a catch position engaging behind a catch edge of the bearing part fixed to the bracket and thereby secures the displaceable shell part against axial shifting.

12. The device according to claim 11, wherein the displaceable shell part is provided, at its end remote from the hydraulic unit, with a radially extending catch tongue which is resiliently deflectable in the axial direction and which starts from an envelope region of the displaceable shell element having a shallow bell joining the U-shaped guide sections and mating over a sector region with the outer envelope surface of the respective rubber buffer, whereby in the mounting position of the shell part to ensure fixing to the bearing element, a transverse catch edge of the radial bottom flange of the bearing element is arranged on its side facing the rubber buffer so as to engage behind it with a narrow overlap, such that inner faces of the catch tongue, which inner faces face the rubber buffer extend coplanar.

13. The device according to claim 12, wherein the longitudinal guide legs of the bearing elements fixed to the bracket terminate in transverse edges which extend in a plane running at right angles to the central longitudinal axis and which are arranged at an axial distance from at least one of the supporting legs fixed to the bracket, and the displaceable shell parts are provided with resiliently flexible catch tongues having free ends which, in a predetermined position of the displaceable shell parts, are mutually supported axially relative to the transverse edges, of the longitudinal guide legs, facing the hydraulic unit.

14. The device according to claim 13, wherein the displaceable shell parts ar provided with web-shaped resiliently flexible catch elements arranged at an axial distance from their ends facing the hydraulic unit and which, in the desired position of the displaceable shell parts, lock into depressions, which are configured to complement the free ends of the longitudinal guide legs of the bearing elements fixed to the bracket.

15. The device according to claim 14, wherein the resiliently flexible catch webs of the displaceable shell parts are arranged on guide-groove portions, whose clearance is larger by at least the deflection stroke of the catch webs than the thickness of the longitudinal guide legs of the bearing elements fixed to the bracket.

16. The device according to claim 9, wherein the displaceable shell parts are provided with web-shaped resiliently flexible catch elements arranged at an axial distance from their ends facing the hydraulic unit and which, in the desired position of the displaceable shell parts, lock into depressions, which are configured to complement the free ends of the longitudinal guide legs of the bearing elements fixed to the bracket.

* * * * *